US012606191B2

(12) United States Patent
Kang

(10) Patent No.: US 12,606,191 B2
(45) Date of Patent: Apr. 21, 2026

---

(54) AUTONOMOUS DRIVING CONTROL APPARATUS AND METHOD THEREOF

(71) Applicants: HYUNDAI MOTOR COMPANY, Seoul (KR); KIA CORPORATION, Seoul (KR)

(72) Inventor: Dong Hoon Kang, Seoul (KR)

(73) Assignees: HYUNDAI MOTOR COMPANY, Seoul (KR); KIA CORPORAITON, Seoul (KR)

( * ) Notice: Subject to any disclaimer, the term of this patent is extended or adjusted under 35 U.S.C. 154(b) by 56 days.

(21) Appl. No.: 18/603,580

(22) Filed: Mar. 13, 2024

(65) Prior Publication Data

US 2025/0136135 A1    May 1, 2025

(30) Foreign Application Priority Data

Oct. 31, 2023    (KR) ......................... 10-2023-0148144

(51) Int. Cl.
B60Q 1/00          (2006.01)
B60W 50/02          (2012.01)
(Continued)

(52) U.S. Cl.
CPC ........ B60W 50/14 (2013.01); B60W 50/0205 (2013.01); B60W 50/029 (2013.01); B60W 60/001 (2020.02); B60W 2050/021 (2013.01); B60W 2050/0215 (2013.01); B60W 2050/146 (2013.01); B60W 2520/105 (2013.01); B60W 2552/15 (2020.02); B60W 2556/45 (2020.02)

(58) Field of Classification Search
CPC ............. B60W 50/14; B60W 50/0205; B60W 50/029; B60W 60/001; B60W 2050/021; B60W 2050/0215; B60W 2050/146; B60W 2520/105; B60W 2552/15; B60W 2556/45; B60W 2720/106; B60W 60/00; B60W 50/0225; B60Y 2306/15

USPC ......................................................... 340/438
See application file for complete search history.

(56) References Cited

U.S. PATENT DOCUMENTS 11,521,271 B2 * 12/2022  Slusar .................... G06Q 50/40
11,922,734 B1 *  3/2024  Kellett ................... G07C 5/085
(Continued)

*Primary Examiner* — Tai T Nguyen
(74) *Attorney, Agent, or Firm* — Lempia Summerfield Katz LLC

(57)          ABSTRACT

An autonomous driving control apparatus includes a sensor device, a notification device, a memory, and a controller. In particular, the autonomous driving control apparatus identifies whether an autonomous driving control function for a host vehicle deteriorates, based on at least one of an operation state of the sensor device, driving information of the host vehicle, or any combination thereof. The autonomous driving control apparatus changes an autonomous driving control parameter including at least one of a sensor parameter, a deceleration and acceleration parameter, or any combination, when it is identified that the autonomous driving control function deteriorates. The autonomous driving control apparatus outputs at least one of the operation state of the sensor device, the driving information of the host vehicle, whether the autonomous driving control function deteriorates, whether autonomous driving control parameter changes, or any combination thereof, using the notification device.

20 Claims, 9 Drawing Sheets

AUTONOMOUS DRIVING CONTROL APPARATUS 100

SENSOR DEVICE 110

NOTIFICATION DEVICE 120

MEMORY 130

CONTROLLER 140

(51) Int. Cl.
   *B60W 50/029*   (2012.01)
   *B60W 50/14*   (2020.01)
   *B60W 60/00*   (2020.01)

(56)              References Cited

U.S. PATENT DOCUMENTS

| 2021/0116256 | A1* | 4/2021 | Konrardy | ............. | G06Q 50/265 |
| 2021/0278840 | A1* | 9/2021 | Jaegal | .................. | G05D 1/0242 |
| 2022/0348225 | A1* | 11/2022 | Kumano | ........... | B60W 50/0205 |
| 2023/0399022 | A1* | 12/2023 | Quibriac | ........... | B60W 60/0015 |

* cited by examiner

AUTONOMOUS DRIVING CONTROL APPARATUS AND METHOD THEREOF

CROSS-REFERENCE TO RELATED APPLICATION

This application claims the benefit of and the priority to Korean Patent Application No. 10-2023-0148144, filed in the Korean Intellectual Property Office on Oct. 31, 2023, the entire contents of which are incorporated herein by reference.

TECHNICAL FIELD

The present disclosure relates to an autonomous driving control apparatus and a method thereof, and more particularly, relates to technologies of providing a user with information about autonomous driving performance or a driving situation of the host vehicle.

BACKGROUND

The statements in this section merely provide background information related to the present disclosure and may not constitute prior art.

As autonomous vehicles have been gradually spread, various technologies about autonomous driving have been developed. The autonomous driving may be divided into partial autonomous driving, conditional autonomous driving, high autonomous driving, and/or full autonomous driving based on its control level.

Meanwhile, various types of control algorithms (or functions) for notifying a user of various events (e.g., deterioration in specific device), which occur while performing driving control for a host vehicle, have been developed among autonomous driving control functions.

For example, an autonomous driving control apparatus may provide the user with information that a specified function (e.g., acceleration, deceleration, and/or a lane change) is performed based on various schemes, while performing autonomous driving control for the host vehicle.

However, the information provided to the user by the autonomous driving control apparatus does not include whether the autonomous driving control apparatus performs the specified function with any degree of performance. Thus, the user is unable to directly know a change in performance of the autonomous driving control function when a specific event (e.g., a driving situation, deterioration in sensor performance, or the like) occurs in the process of receiving information about the same function. Furthermore, in such a situation, the user may feel anxiety that the autonomous driving control function is not performing smoothly.

In addition, because information provided to the user for an update is somewhat insufficient in the process of performing the update (e.g., a function update through OTA) of some of devices performing the autonomous driving control function based on information received from an external device (e.g., a server) depending on identifying the specific event, the user does not accurately know a change in performance of the autonomous driving control function.

SUMMARY

The present disclosure has been made to solve the above-mentioned problems occurring in the prior art while advantages achieved by the prior art are maintained intact.

An aspect of the present disclosure provides an autonomous driving control apparatus for identifying whether an autonomous driving control function for a host vehicle deteriorates based on at least one an operation state of a sensor device, driving information of the host vehicle, or any combination thereof.

Another aspect of the present disclosure provides an autonomous driving control apparatus for changing an autonomous driving control parameter including at least one of a sensor parameter, a deceleration and acceleration parameter, or any combination thereof, when it is identified that an autonomous driving control function deteriorates.

Another aspect of the present disclosure provides an autonomous driving control apparatus for outputting at least one of an operation state of a sensor device, driving information of a host vehicle, whether an autonomous driving control function deteriorates, whether an autonomous driving control parameter changes, or any combination thereof, using a notification device.

Another aspect of the present disclosure provides an autonomous driving control apparatus for outputting at least one of whether a hardware problem about a sensor device is a temporary problem, whether the hardware problem is recoverable, or any combination thereof using a notification device, when identifying that the hardware problem occurs, based on the result of comparing sensor data obtained using a sensor device with a reference parameter stored in a memory.

Another aspect of the present disclosure provides an autonomous driving control apparatus for identifying whether a problem occurring in a sensor device is a hardware problem or a software problem about the sensor device, when determining that the problem occurs in the sensor device based on sensor data, and for changing a sensor parameter in a different scheme based on a type of the identified problem.

Another aspect of the present disclosure provides an autonomous driving control apparatus for changing a deceleration and acceleration parameter based on a difference between real-time acceleration of a host vehicle and required acceleration for autonomous driving control, when a gradient of a road on which the host vehicle is driving is included in a specified range, and for providing a user with such a change process using a notification device.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an autonomous driving control apparatus may include a sensor device, a notification device, a memory configured to store at least one instruction, and a controller operatively connected to the sensor device, the notification device, and the memory. In one embodiment, the at least one instruction may be configured to, when executed by the controller, cause the autonomous driving control apparatus to identify whether an autonomous driving control function for a host vehicle deteriorates, based on at least one of an operation state of the sensor device, driving information of the host vehicle, or any combination thereof. The autonomous driving control apparatus may also be caused to change an autonomous driving control parameter including at least one of a sensor parameter, a deceleration and acceleration parameter, or any combination, when it is identified that the autonomous driving control function deteriorates. The autonomous driving control apparatus may also be caused to output at least one of the operation state of the sensor device, the driving information of the host vehicle, whether the autonomous driving control function deteriorates, whether autonomous driving control parameter changes, or any combination thereof, using the notification device.

According to an embodiment, the at least one instruction may be configured to, when executed by the controller, cause the autonomous driving control apparatus to output at least one of whether a hardware problem about the sensor device is a temporary problem, whether the hardware problem is recoverable, or any combination thereof using the notification device, when identifying that the hardware problem occurs, based on the result of comparing sensor data obtained using the sensor device with a reference parameter stored in the memory.

According to an embodiment, the at least one instruction may be configured to, when executed by the controller, cause the autonomous driving control apparatus to identify software performance of the sensor device, based on a result of comparing sensor data obtained using the sensor device with a reference parameter stored in the memory. The autonomous driving control apparatus may also be caused to identify the operation state including information that a difference between the identified software performance of the sensor device and predetermined performance is greater than a specified value, based on the identified software performance. The autonomous driving control apparatus may also be caused to change the sensor parameter based on the operation state identified a specified number of times, when the number of times the operation state is identified is greater than or equal to the specified number of times.

According to an embodiment, the at least one instruction may be configured to, when executed by the controller, cause the autonomous driving control apparatus to gradually change the changed sensor parameter to an initial parameter as time passes, when it is identified that the difference between the software performance of the sensor device and the predetermined performance is less than or equal to the specified value, after changing the sensor parameter.

According to an embodiment, the at least one instruction may be configured to, when executed by the controller, cause the autonomous driving control apparatus to identify the driving information including a gradient of a road on which the host vehicle is driving and real-time acceleration of the host vehicle. The autonomous driving control apparatus may also be caused to identify a difference between the real-time acceleration and required acceleration. The autonomous driving control apparatus may also be caused to identify at least one deceleration and acceleration parameter for deceleration of the host vehicle based on a magnitude of the difference, when it is identified that the gradient meets a specified condition and that the difference is greater than or equal to a specified value. The autonomous driving control apparatus may also be caused to perform driving control for the host vehicle based on a minimum value among the at least one deceleration and acceleration parameter. The autonomous driving control apparatus may also be caused to output information about a change in the deceleration and acceleration parameter and the driving control using the notification device.

According to an embodiment, the at least one instruction may be configured to, when executed by the controller, cause the autonomous driving control apparatus to identify a driving mode of the host vehicle. The autonomous driving control apparatus may also be caused to identify required acceleration for each driving speed of the identified driving mode. The autonomous driving control apparatus may also be caused to accumulate and identify error data including a difference between the required acceleration and real-time acceleration of the host vehicle. The autonomous driving control apparatus may also be caused to change the deceleration and acceleration parameter based on an average value of the accumulated error data, when it is identified that the error data is accumulated by a specified amount or more.

According to an embodiment, the at least one instruction may be configured to, when executed by the controller, cause the autonomous driving control apparatus to set and store the changed deceleration and acceleration parameter to a default deceleration and acceleration parameter in the memory. The autonomous driving control apparatus may also be caused to determine whether the autonomous driving control function deteriorates, based on the default deceleration and acceleration parameter.

According to an embodiment, the at least one instruction may be configured to, when executed by the controller, cause the autonomous driving control apparatus to compare a reference sensor performance index stored in the memory with the operation state of the sensor device to identify whether the autonomous driving control function deteriorates. For example, the reference sensor performance index may include at least one parameter less than maximum performance of the sensor device.

According to an embodiment, the at least one instruction may be configured to, when executed by the controller, cause the autonomous driving control apparatus to transmit data logging about driving of the host vehicle before a specified time from a time point when a debug request input about the autonomous driving control function is received to an external device, when receiving the debug request input from a user. The autonomous driving control apparatus may also be caused to receive information about whether the autonomous driving control function deteriorates, the information corresponding to the data logging, and deterioration improvement information from the external device. The autonomous driving control apparatus may also be caused to output the information about whether the autonomous driving control function deteriorates and the deterioration improvement information, using the notification device.

According to an embodiment, the at least one instruction may be configured to, when executed by the controller, cause the autonomous driving control apparatus to output a change about driving performance of the host vehicle, the driving performance including at least one of acceleration, ride quality, quietness, camera recognition performance, radar recognition performance, handling, braking performance, fuel efficiency, or any combination thereof, based on a specified period, using the notification device.

According to another aspect of the present disclosure, an autonomous driving control method may include identifying, by a controller, whether an autonomous driving control function for a host vehicle deteriorates, based on at least one of an operation state of a sensor device, driving information of the host vehicle, or any combination thereof. The autonomous driving control method may also include changing, by the controller, an autonomous driving control parameter including at least one of a sensor parameter, a deceleration and acceleration parameter, or any combination, when it is identified that the autonomous driving control function deteriorates. The autonomous driving control method may include outputting, by the controller, at least one of the operation state of the sensor device, the driving information of the host vehicle, whether the autonomous driving control function deteriorates, whether the autonomous driving control parameter changes, or any combination thereof, using a notification device.

According to an embodiment, the autonomous driving control method may further include outputting, by the controller, at least one of whether a hardware problem about the sensor device is a temporary problem, whether the hardware problem is recoverable, or any combination thereof using the notification device, when identifying that the hardware problem occurs, based on a result of comparing sensor data obtained using the sensor device with a reference parameter stored in a memory.

According to an embodiment, the autonomous driving control method may further include identifying, by the controller, software performance of the sensor device, based on the result of comparing sensor data obtained using the sensor device with a reference parameter stored in a memory. The autonomous driving control method may further include identifying, by the controller, the operation state including information that a difference between the identified software performance of the sensor device and predetermined performance is greater than a specified value, based on the identified software performance. The autonomous driving control method may further include changing, by the controller, the sensor parameter based on the operation state identified a specified number of times, when the number of times the operation state is identified is greater than or equal to the specified number of times.

According to an embodiment, the autonomous driving control method may further include gradually changing, by the controller, the changed sensor parameter to an initial parameter as time passes, when it is identified that the difference between the software performance of the sensor device and the predetermined performance is less than or equal to the specified value, after changing the sensor parameter.

According to an embodiment, the autonomous driving control method may further include identifying, by the controller, the driving information including a gradient of a road on which the host vehicle is driving and real-time acceleration of the host vehicle. The autonomous driving control method may further include identifying, by the controller, a difference between the real-time acceleration and required acceleration. The autonomous driving control method may further include identifying, by the controller, at least one deceleration and acceleration parameter for deceleration of the host vehicle based on a magnitude of the difference, when it is identified that the gradient meets a specified condition and that the difference is greater than or equal to a specified value. The autonomous driving control method may further include performing, by the controller, driving control for the host vehicle based on a minimum value among the at least one deceleration and acceleration parameter. The autonomous driving control method may further include outputting, by the controller, information about a change in the deceleration and acceleration parameter and the driving control using the notification device.

According to an embodiment, the autonomous driving control method may further include identifying, by the controller, a driving mode of the host vehicle. The autonomous driving control method may further include identifying, by the controller, required acceleration for each driving speed of the identified driving mode. The autonomous driving control method may further include accumulating and identifying, by the controller, error data including a difference between the required acceleration and real-time acceleration of the host vehicle. The autonomous driving control method may further include changing, by the controller, the deceleration and acceleration parameter based on an average value of the accumulated error data, when it is identified that the error data is accumulated by a specified amount or more.

According to an embodiment, the autonomous driving control method may further include setting and storing, by the controller, the changed deceleration and acceleration parameter to a default deceleration and acceleration parameter in a memory. The autonomous driving control method may further include determining, by the controller, whether the autonomous driving control function deteriorates, based on the default deceleration and acceleration parameter.

According to an embodiment, the autonomous driving control method may further include comparing, by the controller, a reference sensor performance index stored in a memory with the operation state of the sensor device to identify whether the autonomous driving control function deteriorates. For example, the reference sensor performance index may include at least one parameter less than maximum performance of the sensor device.

According to an embodiment, the autonomous driving control method may further include transmitting, by the controller, data logging about driving of the host vehicle before a specified time from a time point when a debug request input about the autonomous driving control function is received to an external device, when receiving the debug request input from a user. The autonomous driving control method may further include receiving, by the controller, information about whether the autonomous driving control function deteriorates, the information corresponding to the data logging, and deterioration improvement information from the external device. The autonomous driving control method may further include outputting, by the controller, the information about whether the autonomous driving control function deteriorates and the deterioration improvement information, using the notification device.

According to an embodiment, the autonomous driving control method may further include outputting, by the controller, a change about driving performance of the host vehicle, the driving performance including at least one of acceleration, ride quality, quietness, camera recognition performance, radar recognition performance, handling, braking performance, fuel efficiency, or any combination thereof, based on a specified period, using the notification device.

BRIEF DESCRIPTION OF THE DRAWINGS

The above and other objects, features, and advantages of the present disclosure should be more apparent from the following detailed description taken in conjunction with the accompanying drawings.

Figure 1:
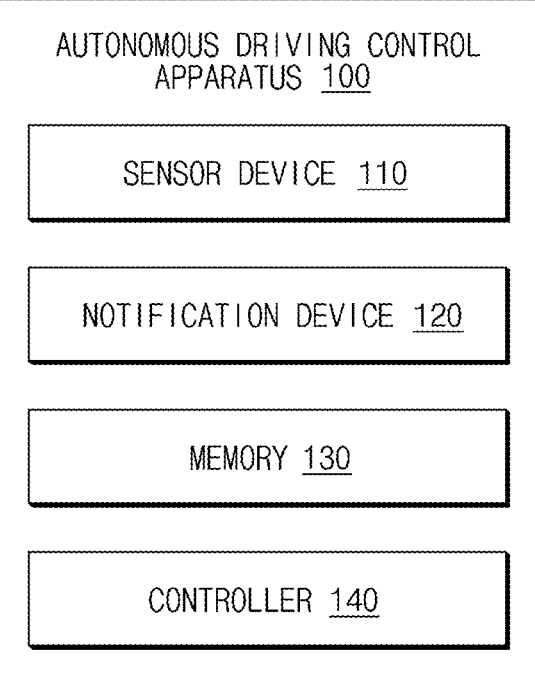
FIG. 1 is a block diagram illustrating components of an autonomous driving control apparatus according to an embodiment of the present disclosure.

With regard to description of drawings, the same or similar denotations may be used for the same or similar components.

DETAILED DESCRIPTION

Hereinafter, some embodiments of the present disclosure are described in detail with reference to the drawings. In adding the reference numerals to the components of each drawing, it should be noted that the identical or equivalent components are designated by the identical numerals even when the components are displayed on other drawings. In addition, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element and do not limit the corresponding elements irrespective of the order or priority of the corresponding elements. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art. The terms should not be interpreted as having ideal or excessively formal meanings unless clearly defined as having such in the present application. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, embodiments of the present disclosure are described in detail with reference to FIGS. 1-9.

FIG. 1 is a block diagram illustrating components of an autonomous driving control apparatus according to an embodiment of the present disclosure.

According to an embodiment, an autonomous driving control apparatus 100 may include at least one of a sensor device 110, a notification device 120, a memory 130, a controller 140, or any combination thereof. The components of the autonomous driving control apparatus 100, which are shown in FIG. 1, are illustrative, and embodiments of the present disclosure are not limited thereto. For example, the autonomous driving control apparatus 100 may further include components (e.g., at least one of an interface, a communication device, a display, or any combination thereof), which are not shown in FIG. 1.

According to an embodiment, the sensor device 110 may obtain (or identify) various pieces of information used for driving of a host vehicle.

For example, the sensor device 110 may include at least one sensor including at least one of a camera, radio detection and ranging (RADAR), light detection and ranging (Li-DAR), or any combination thereof.

For example, the sensor 110 may operate based on a sensor parameter. As an example, the sensor parameter may be an example of a setting value about operation performance of the sensor device 110, which may be stored in the memory 130. As an example, the sensor parameter may be a setting value capable of being changed by a user and/or a developer.

For example, the autonomous driving control apparatus 100 may change the sensor parameter based on identifying driving information of the host vehicle and/or a change in performance of the sensor device 110. The autonomous driving control apparatus 100 may identify, for example, whether the change in performance of the sensor device 110 is a hardware problem or a software problem of the sensor device 110. As an example, when it is identified that the change in performance of the sensor device 110 is the hardware problem, the autonomous driving control apparatus 100 may identify whether the problem is a temporary problem or a permanent problem.

As an example, when at least a portion of an area, which should be sensed by the sensor device 110, is covered by a specific object, the autonomous driving control apparatus 100 may identify that the performance of the sensor device 110 deteriorates based on the sensing data obtained by the sensor device 110 in the corresponding case and may identify that the reason is the temporary problem (e.g., covering).

As an example, when it is identified that the sensor device 110 is in a failure state, the autonomous driving control apparatus 100 may identify that the performance of the sensor device 110 deteriorates and may identify that the reason corresponds to the permanent problem (e.g., a permanent failure).

As an example, when the software problem about the sensor device 110 is identified a specified number of times or more, the autonomous driving control apparatus 100 may update a sensor parameter for an operation of the sensor device 110 (e.g., update the sensor parameter to more sensitively operate the sensor device 110). The software problem may be, for example, a temporary problem due to disturbance (or noise) for the sensor device 110. Updating the sensor parameter, the autonomous driving control apparatus 100 may degrade the reliability of the sensor device 110 as time passes when it is not identified whether the performance of the sensor device 110 changes (e.g., deteriorates or is improved) (e.g., when problematic data is no longer identified) and may gradually change the sensor parameter to an initial parameter (e.g., an initial sensor parameter, which is initially set) from a time point when the reliability is less than or equal to a specified value.

According to an embodiment, the notification device 120 may include various types of output devices. The autonomous driving control apparatus 100 may output at least one of a change in performance of the sensor device 110, an operation state of the sensor device 110, driving information of the host vehicle, whether an autonomous driving control function deteriorates, whether an autonomous driving control parameter changes, or any combination thereof to the user using the notification device 120.

For example, the notification device 120 may include at least one display device (e.g., a display).

For example, the notification device 120 may include at least one sound output device (e.g., a speaker).

For example, the notification device 120 may include at least one haptic device. The haptic device may be provided in at least one area of a seat to provide the user with vibration.

According to an embodiment, the memory 130 may store a command or data. For example, the memory 130 may store one or more instructions, when executed by the controller 140, causing the autonomous driving control apparatus 100 to perform various operations.

For example, the memory 130 and the controller 140 may be implemented as one chipset. The controller 140 may include at least one of a communication processor or a modem.

For example, the memory 130 may store various pieces of information associated with the autonomous driving control apparatus 100. As an example, the memory 130 may store information about an operation history of the controller 140. As an example, the memory 130 may store information associated with states and/or operations of components (e.g., at least one of an engine control unit (ECU), the sensor device 110, the notification device 120, the controller 140, or any combination thereof) of the host vehicle.

For example, the memory 130 may store the sensor parameter. The memory 130 may store the initial sensor parameter. The initial sensor parameter may include, for example, a parameter value about operation performance of the sensor device 110. As an example, the initial sensor parameter may include information that a guaranteed sensing distance of the RADAR corresponds to a specified distance (e.g., 100 m).

According to an embodiment, the controller 140 may be operatively connected with the sensor device 110 and/or the memory 130. For example, the controller 140 may control operations of the sensor device 110 and/or the memory 130.

For example, the controller 140 may identify whether the autonomous driving control function for the host vehicle deteriorates, based on at least one of an operation state of the sensor device 110, driving information of the host vehicle, or any combination thereof.

As an example, the controller 140 may identify that a hardware problem and/or a software problem about the sensor device 110 occurs, based on the result of comparing sensor data obtained using the sensor device 110 with a reference parameter stored in the memory 130. The reference parameter may be defined as, for example, an initial parameter.

As an example, when identifying that the hardware problem about the sensor device 110 occurs, the controller 140 may output at least one of whether the hardware problem is a temporary problem or a permanent problem, whether the hardware problem is a recoverable problem, or any combination thereof to the user using the notification device 120.

For example, when it is identified that the autonomous driving control function deteriorates, the controller 140 may change an autonomous driving control parameter including at least one of a sensor parameter, a deceleration and acceleration parameter, or any combination thereof.

As an example, the controller 140 may identify software performance of the sensor device 110 based on the compared result and may determine whether the performance of the sensor device 110 changes based on the identified software performance. For example, when identifying that the identified performance of the sensor device 110 is more improved or deteriorates than predetermined performance (or when identifying that a difference between the identified performance of the sensor device 110 and the predetermined performance is greater than a specified value), the controller 140 may determine that the performance of the sensor device 110 changes. When verifying information that the difference between the performance of the sensor device 110 and the predetermined performance is greater than the specified value among pieces of information included in the operation state of the sensor device 110, the controller 140 may determine that the performance of the sensor device 110 changes. For example, when the number of times the performance of the sensor device 110 changes (or the number of times the operation state determined that the performance changes is identified) is greater than or equal to a specified number of times, the controller 140 may change the sensor parameter based on the operation state identified the specified number of times. For example, when the number of times determined that the sensor device 110 deteriorates is greater than or equal to the specified number of times, the controller 140 may change the sensor parameter in the direction of improving sensitivity of the sensor device 110.

As an example, when identifying that the performance of the sensor device 110 is recovered or when time passes after changing the sensor parameter, the controller 140 may change the changed sensor parameter to the initial parameter again. For example, after changing the sensor parameter, when it is identified that the difference between the performance of the sensor device 110 and the predetermined performance is less than or equal to the specified value (or when the performance of the sensor device 110 is within an allowable range), the controller 140 may gradually change the changed sensor parameter to the initial parameter again as time passes.

For example, the controller 140 may change at least some of autonomous driving control parameters including a deceleration and acceleration parameter based on the driving information of the host vehicle.

As an example, the controller 140 may identify driving information including a gradient of a road on which the host vehicle is driving and real-time acceleration of the host vehicle. The controller 140 may identify, for example, a difference between real-time acceleration and required acceleration. When it is identified that the gradient meets a specified condition (e.g., when the gradient is greater than 4% in an uphill section or when the gradient is less than −4% in a downhill section) and when the difference is greater than or equal to a specified value (e.g., 0.2 m/s$^2$), the controller 140 may identify at least one deceleration and acceleration parameter for deceleration of the host vehicle based on a magnitude of the difference (or a magnitude of an absolute value of the difference) and may perform driving control (or deceleration control) for the host vehicle based on a minimum value among the at least one deceleration and acceleration parameter. In other words, when identifying that the host vehicle is driving in a state in which the controller 140 does not correctly follow required acceleration for deceleration in a section where the slope is relatively steep, the controller 140 may change a deceleration and acceleration parameter such that real-time acceleration better follows the required acceleration. The controller 140 may output, for example, information about a change in deceleration and acceleration and driving control using the notification device 120.

For example, the controller 140 may determine whether to change the deceleration and acceleration based on a type of the driving mode of the host vehicle.

As an example, the controller 140 may identify a driving mode of the host vehicle. The driving mode may include at least one of, for example, a normal mode, a sports mode, a hybrid mode, or any combination thereof. The controller 140 may identify, for example, required acceleration for each driving speed of the identified driving mode. For example, when the host vehicle is driving at a first speed and a second speed in the normal mode, the controller 140 may identify predetermined required acceleration for deceleration or acceleration in response to the speed interval.

As an example, the controller 140 may accurate and identify error data including a difference between the identified required acceleration and real-time acceleration of the host vehicle. Thereafter, when it is identified that the error data is accumulated by a specified amount or more, the controller 140 may change a deceleration and acceleration parameter based on an average value of the pieces of accumulated error data. In other words, the controller 140 may change the deceleration and acceleration parameter using the average value (or an average error) of the pieces of error data between the required acceleration and the real-time acceleration.

As an example, the controller 140 may set and store the changed deceleration and acceleration parameter to a default deceleration and acceleration parameter in the memory 130. In other words, when changing the deceleration and acceleration parameter in the embodiment about the driving mode, the controller 140 may set the changed deceleration and acceleration parameter to the default deceleration and acceleration parameter before a situation in which it is required to change the changed deceleration and acceleration parameter again and may perform driving control for the host vehicle. Thus, the controller 140 may continuously determine whether the autonomous driving control function deteriorates based on the set default deceleration and acceleration parameter.

For example, the controller 140 may compare a reference sensor performance index stored in the memory 130 with the operation state of the sensor device 110 to identify whether the autonomous driving control function deteriorates. The reference sensor performance index may include, for example, at least one parameter less than maximum performance of the sensor device 110. As an example, the reference sensor performance index may include at least one parameter corresponding to performance, which decreases by a specified rate (e.g., 20%) from the maximum performance of the sensor device 110.

For example, when receiving a debug request input about the autonomous driving control function from the user, the controller 140 may transmit data logging about the driving of the host vehicle to an external device (e.g., a server) before a specified time (e.g., 5 minutes) from a time point when the debug request input is received. As an example, the controller 140 may receive information about whether the autonomous driving control function deteriorates, which corresponds to the data logging, (e.g., a deterioration type, a deterioration degree, or whether it is improved or recovered) and deterioration improvement information (e.g., information for an update) from the external device. The controller 140 may also output information about whether the autonomous driving control function deteriorates and the deterioration improvement information using the notification device 120. The controller 140 may perform an update (e.g., an OTA update) for at least some of the components of the autonomous driving control apparatus 100 using the deterioration improvement information.

For example, the controller 140 may output at least one of an operation state of the sensor device 110 (e.g., whether the sensor parameter changes, a change in performance of the sensor device 110, or deterioration information of the sensor device 110), driving information of the host vehicle (e.g., a gradient, acceleration, fuel efficiency, ride quality, braking performance, or recognition performance of the sensor device 110), whether the autonomous driving control function deteriorates, whether an autonomous driving control parameter (e.g., a sensor parameter and/or a deceleration and acceleration parameter) changes, or any combination thereof, using the notification device 120.

As an example, the controller 140 may output a change about driving performance of the host vehicle, which includes at least one of the acceleration, the ride quality, quietness, camera recognition performance, radar recognition performance, handling, the braking performance, or the fuel efficiency, or any combination thereof based on a specified period, using the notification device 120.

Figure 2:
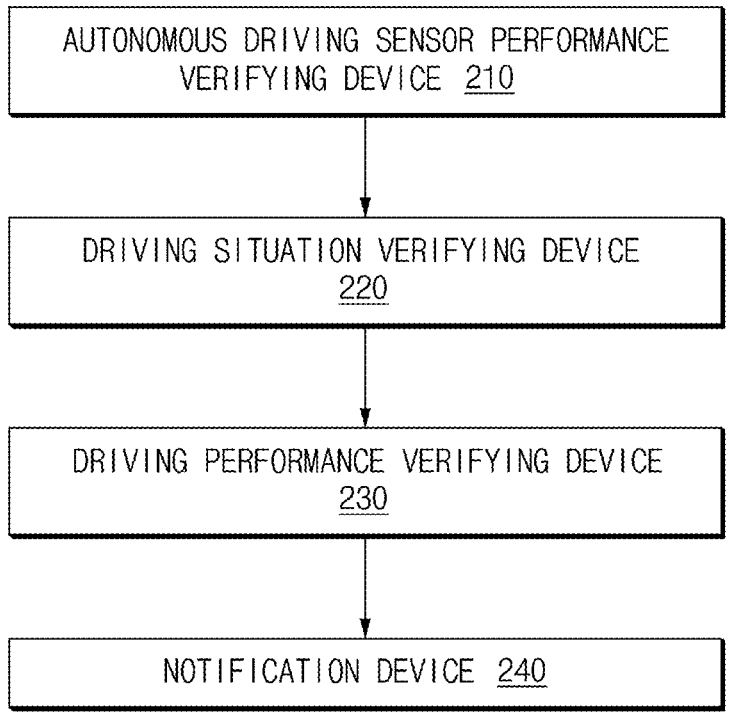
FIG. 2 is a block diagram illustrating components of an autonomous driving control apparatus according to an embodiment of the present disclosure.

FIG. 2 is a block diagram illustrating components of an autonomous driving control apparatus according to an embodiment of the present disclosure.

According to an embodiment, an autonomous driving control apparatus (e.g., an autonomous driving control apparatus 100 of FIG. 1) may include at least one of an autonomous driving sensor performance verifying device 210, a driving situation verifying device 220, a driving performance verifying device 230, a notification device 240, or any combination thereof.

The structure of the components shown in FIG. 2 is illustrative, and embodiments of the present disclosure are not limited thereto. For example, at least some (e.g., the autonomous driving sensor performance verifying device 210, the driving situation verifying device 220, and/or the driving performance verifying device 230) of the components shown in FIG. 2 may be implemented as a part of a controller 140 and/or a sensor device 110 of FIG. 1 or may be implemented together with the controller 140 and/or the sensor device 110 as one chip. In other words, at least some of operations of at least some of components, which are described below, may be performed by the controller 140 and/or the sensor device 110 of FIG. 1 (or control of the controller 140).

For example, the autonomous driving sensor performance verifying device 210 may monitor a state of a sensor device and may deliver at least a portion of the monitored result to the driving performance verifying device 230.

As an example, the autonomous driving sensor performance verifying device 210 may identify whether deterioration occurs in the sensor device based on data obtained by means of the sensor device.

As an example, the autonomous driving sensor performance verifying device 210 may identify a type of a problem (e.g., a hardware problem or a software problem), which occurs in the sensor device, and may deliver information about a corresponding situation to the driving performance verifying device 230 when the problem repeatedly occurs during a specified time or more.

As an example, when the reliability of sensor data is degraded to a certain value or more by disturbance (or noise), the autonomous driving sensor performance verifying device 210 may count the case in which a change in recognition distance of the sensor device occurs and may deliver information about the corresponding situation to the driving performance verifying device 230 when it is identified that the counted number is greater than or equal to a certain number of times.

For example, the driving situation verifying device 220 may identify a driving situation and/or driving information of the host vehicle.

As an example, the driving situation verifying device 220 may identify at least one of a gradient of a road on which the host vehicle is driving, a dangerous section in which cut-in occurs, real-time acceleration of the host vehicle, required acceleration of the host vehicle, or any combination thereof.

As an example, the driving situation verifying device 220 may identify a driving situation and/or driving information of the host vehicle based on at least one of navigation, vehicle-to-everything (V2X) communication, or any combination thereof.

For example, the driving performance verifying device 230 may identify whether a change (e.g., deterioration or improvement) in performance of an autonomous driving control function based on pieces of information obtained by the autonomous driving sensor performance verifying device 210 and the driving situation verifying device 220. Furthermore, the driving performance verifying device 230 may identify whether the change in performance of the autonomous driving control function is a temporary phenomenon or a permanent phenomenon.

As an example, the driving performance verifying device 230 may deliver update information (or deterioration improvement information) about the autonomous driving control function to the notification device 240 to provide a user with the update information.

For example, the notification device 240 may output various pieces of information about driving of the host vehicle to the user using visual, audible, or tactile content.

As an example, the notification device 240 may provide the user with a performance index of the autonomous driving control function (e.g., at least one of acceleration, ride quality, quietness, camera recognition performance, radar recognition performance, handling, braking performance, fuel efficiency, or any combination thereof) by means of the display device.

As an example, when the performance of the autonomous driving control function deteriorates, the notification device 240 may differently output a visual notification (e.g., a notification through a speaker) and/or a tactile notification (e.g., a notification through a haptic device) based on whether the type of the deterioration is temporary deterioration or permanent deterioration. For example, when the deterioration is improved and the performance is restored after the temporary deterioration is identified, the notification device 240 may output operation situations of the autonomous driving control function before and after the performance is improved to the user.

As an example, when the autonomous driving control apparatus receives a user input associated with improving performance (e.g., a debug request input about the autonomous driving control function) and performs an update for the autonomous driving control function in response to the user input (e.g., an update by means of deterioration improvement information received from a server), the notification device 240 may output at least one of an update progress situation, undated contents, changed contents, or any combination thereof in various forms (e.g., milestone form).

Figure 3:
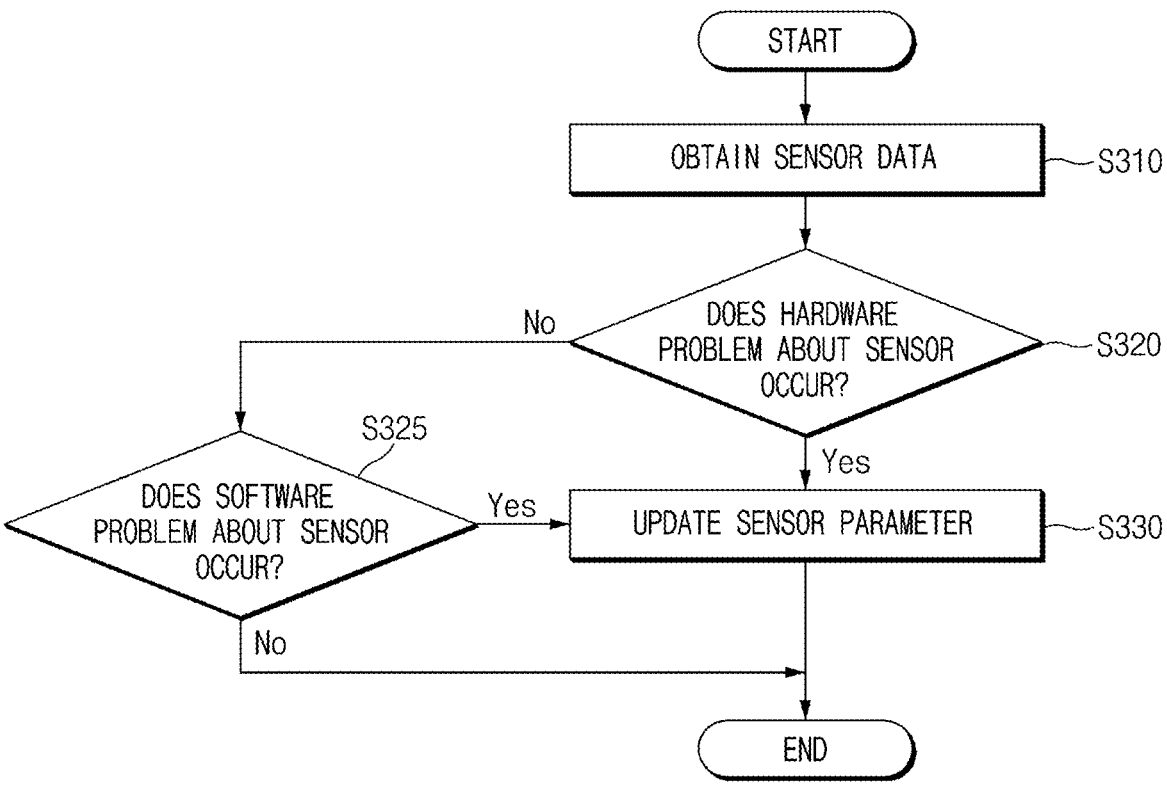
FIG. 3 is a flowchart of an autonomous driving control method according to an embodiment of the present disclosure.

FIG. 3 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 3. For example, at least some of components (e.g., a sensor device 110, a notification device 120, a memory 130, and/or a controller 140 of FIG. 1) included in the autonomous driving control apparatus may be configured to perform the operations of FIG. 3.

Operations in S310, S320, and S330 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 3, may be briefly described or omitted.

According to an embodiment, in S310, the autonomous driving control apparatus may obtain sensor data.

For example, the autonomous driving control apparatus may obtain at least one piece of sensor data necessary to perform autonomous driving control for a host vehicle using a sensor device.

According to an embodiment, in S320, the autonomous driving control apparatus may identify whether a hardware problem about a sensor occurs.

For example, the autonomous driving control apparatus may identify whether the hardware problem about the sensor occurs, based on the result of comparing sensor data obtained using the sensor and a reference parameter stored in a memory.

For example, when it is identified that the hardware problem about the sensor occurs (e.g., S320—Yes), the autonomous driving control apparatus may perform S330.

For example, when it is identified that the hardware problem about the sensor does not occur (e.g., S320—No), the autonomous driving control apparatus may perform S325.

According to an embodiment, in S325, the autonomous driving control apparatus may identify whether a software problem about the sensor occurs.

For example, the autonomous driving control apparatus may identify software performance of the sensor, based on the result of comparing the sensor data obtained using the sensor with the reference parameter stored in the memory. The autonomous driving control apparatus may also identify an operation state including information that a difference between performance of the sensor device and predetermined performance is greater than a specified value, based on the identified software performance. At this time, when the number of times such an operation state is identified is greater than or equal to a specified number of times, the autonomous driving control apparatus may identify that the software problem about the sensor occurs.

For example, when it is identified that the software problem about the sensor occurs (e.g., S320—Yes), the autonomous driving control apparatus may perform S330.

For example, when it is identified that the software problem about the sensor does not occur (e.g., S325—No), the autonomous driving control apparatus may perform the process. Alternatively, the autonomous driving control apparatus may continue obtaining sensor data by means of the sensor.

According to an embodiment, in S330, the autonomous driving control apparatus may update a sensor parameter.

For example, the autonomous driving control apparatus may update the sensor parameter based on a degree to which the hardware problem and/or the software problem of the sensor occur(s) and a degree of a change in performance of the sensor.

For example, when identifying that the software problem for the sensor occurs, the autonomous driving control apparatus may change the sensor parameter to solve the software problem. After changing the sensor parameter, when it is identified that the difference between the performance of the sensor and the predetermined performance is less than or equal to the specified value, the autonomous driving control apparatus may gradually change the sensor parameter to an initial parameter again as time passes.

Figure 4:
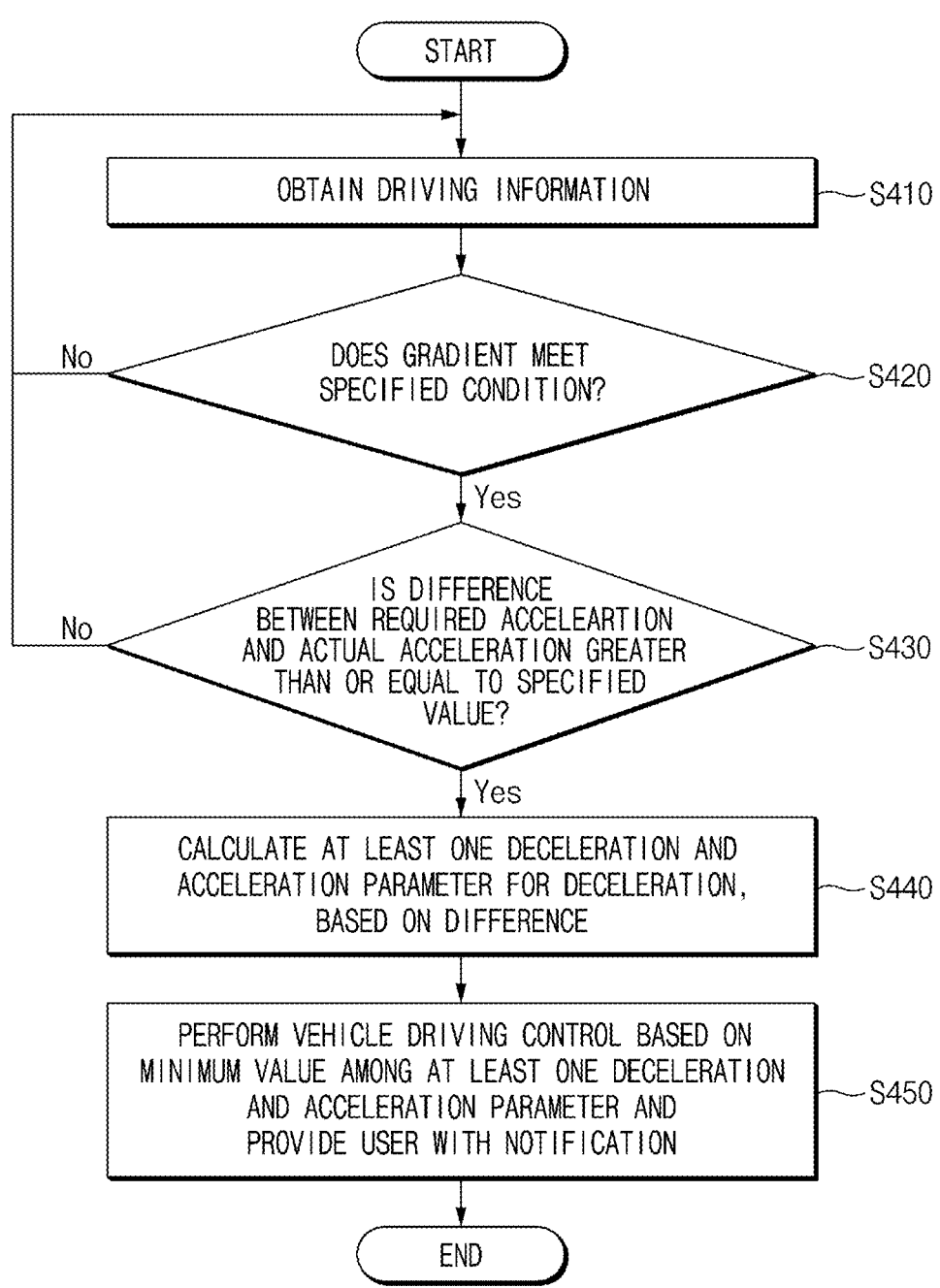
FIG. 4 is a flowchart of an autonomous driving control method according to an embodiment of the present disclosure.

FIG. 4 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 4. For example, at least some of components (e.g., a sensor device 110, a notification device 120, a memory 130, and/or a controller 140 of FIG. 1) included in the autonomous driving control apparatus may be configured to perform the operations of FIG. 4.

Operations in S410 to S450 in an embodiment below may be sequentially performed and are not necessarily sequentially performed. For example, an order of the respective operations may be changed, and at least two operations may be performed in parallel. Furthermore, contents, which correspond to or are duplicated with the contents described above in conjunction with FIG. 4, may be briefly described or omitted.

According to an embodiment, in S410, the autonomous driving control apparatus may obtain driving information.

For example, the autonomous driving control apparatus may identify at least one of a gradient of a road on which a host vehicle is driving, real-time acceleration of the host vehicle, required acceleration of the host vehicle, or any combination thereof.

According to an embodiment, in S420, the autonomous driving control apparatus may identify whether the gradient meets a specified condition.

For example, when identifying that the gradient is greater than a specified gradient (e.g., 4%) on an uphill road or that the gradient is less than a specified gradient (e.g., −4%) on a downhill road, the autonomous driving control apparatus may determine that the gradient meets the specified condition.

For example, when it is identified that the gradient meets the specified condition (e.g., S420—Yes), the autonomous driving control apparatus may perform S430.

For example, when it is identified that the gradient does not meet the specified condition (e.g., S420—No), the autonomous driving control apparatus may repeatedly perform S410.

According to an embodiment, in S430, the autonomous driving control apparatus may identify whether a difference between the required acceleration and the actual acceleration is greater than or equal to a specified value.

For example, the autonomous driving control apparatus may identify whether the difference between the required acceleration generated to control the host vehicle and the actual acceleration generated while the host vehicle is actually driving is greater than or equal to the specified value (e.g., 0.2 m/s$^2$).

For example, when it is identified that the difference between the required acceleration and the actual acceleration is greater than or equal to the specified value (e.g., S430—Yes), the autonomous driving control apparatus may perform S440.

For example, when it is identified that the difference between the required acceleration and the actual acceleration is less than the specified value (e.g., S430—No), the autonomous driving control apparatus may repeatedly perform S410.

According to an embodiment, in S440, the autonomous driving control apparatus may calculate at least one deceleration and acceleration parameter for deceleration, based on a magnitude of the difference between the required acceleration and the actual acceleration (or a magnitude of an absolute value of the difference).

According to an embodiment, in S450, the autonomous driving control apparatus may perform vehicle driving control based on a minimum value among the at least one deceleration and acceleration parameter and may provide the user with a notification.

For example, when the error is relatively large as the actual acceleration does not correctly follow the required acceleration, the autonomous driving control apparatus may perform autonomous driving control based on the deceleration and acceleration parameter corresponding to the minimum value to control the actual acceleration to better follow the required acceleration.

For example, the autonomous driving control apparatus may provide a user with information about information about a history about the process of changing the deceleration and acceleration parameter and a change in autonomous driving control before and after changing the deceleration and acceleration parameter using a notification device.

Figure 5:
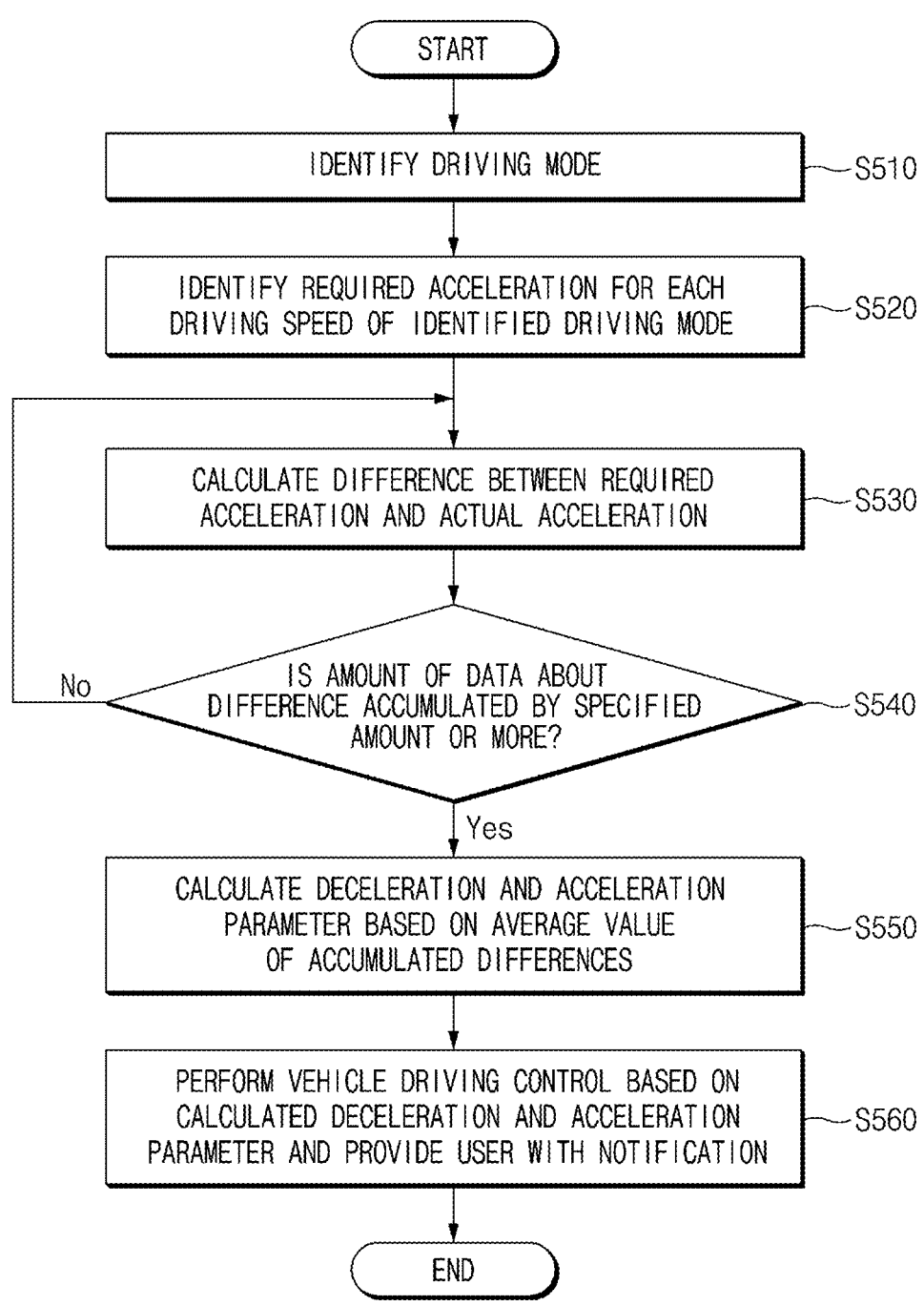
FIG. 5 is a flowchart of an autonomous driving control method according to an embodiment of the present disclosure.

FIG. 5 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 5. For example, at least some of components (e.g., a sensor device 110, a notification device 120, a memory 130, and/or a controller 140 of FIG. 1) included in the autonomous driving control apparatus may be configured to perform the operations of FIG. 5.

Operations in S510 to S560 in an embodiment below may be sequentially performed and are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

According to an embodiment, in S510, the autonomous driving control apparatus may identify a driving mode.

According to an embodiment, in S520, the autonomous driving control apparatus may identify required acceleration for each driving speed of the identified driving mode.

For example, when the host vehicle is driving at a first speed and a second speed in a normal mode, the autonomous driving control apparatus may identify predetermined required acceleration for deceleration or acceleration in response to the speed interval.

According to an embodiment, in S530, the autonomous driving control apparatus may calculate a difference between the required acceleration and actual acceleration.

According to an embodiment, in S540, the autonomous driving control apparatus may identify whether the amount of data about the difference is accumulated by a specified amount or more.

For example, when the amount of the data about the difference between the required acceleration and the actual acceleration is accumulated by the specified amount or more (e.g., S540—Yes), the autonomous driving control apparatus may perform S550.

For example, when the amount of the data about the difference between the required acceleration and the actual acceleration is not accumulated by the specified amount or more (e.g., S540—No), the autonomous driving control apparatus may repeatedly perform S530.

According to an embodiment, in S550, the autonomous driving control apparatus may calculate a deceleration and acceleration parameter based on an average value of the accumulated differences.

According to an embodiment, in S560, the autonomous driving control apparatus may perform vehicle driving control based on the calculated deceleration and acceleration parameter and may provide a user with a notification.

For example, the autonomous driving control apparatus may change a deceleration and acceleration parameter stored in a memory to the calculated deceleration and acceleration parameter and may set the changed deceleration and acceleration parameter to a default deceleration and acceleration parameter.

For example, the autonomous driving control apparatus may provide the user with information about a history about the process of changing the deceleration and acceleration parameter and a change in autonomous driving control before and after changing the deceleration and acceleration parameter using a notification device.

Figure 6:
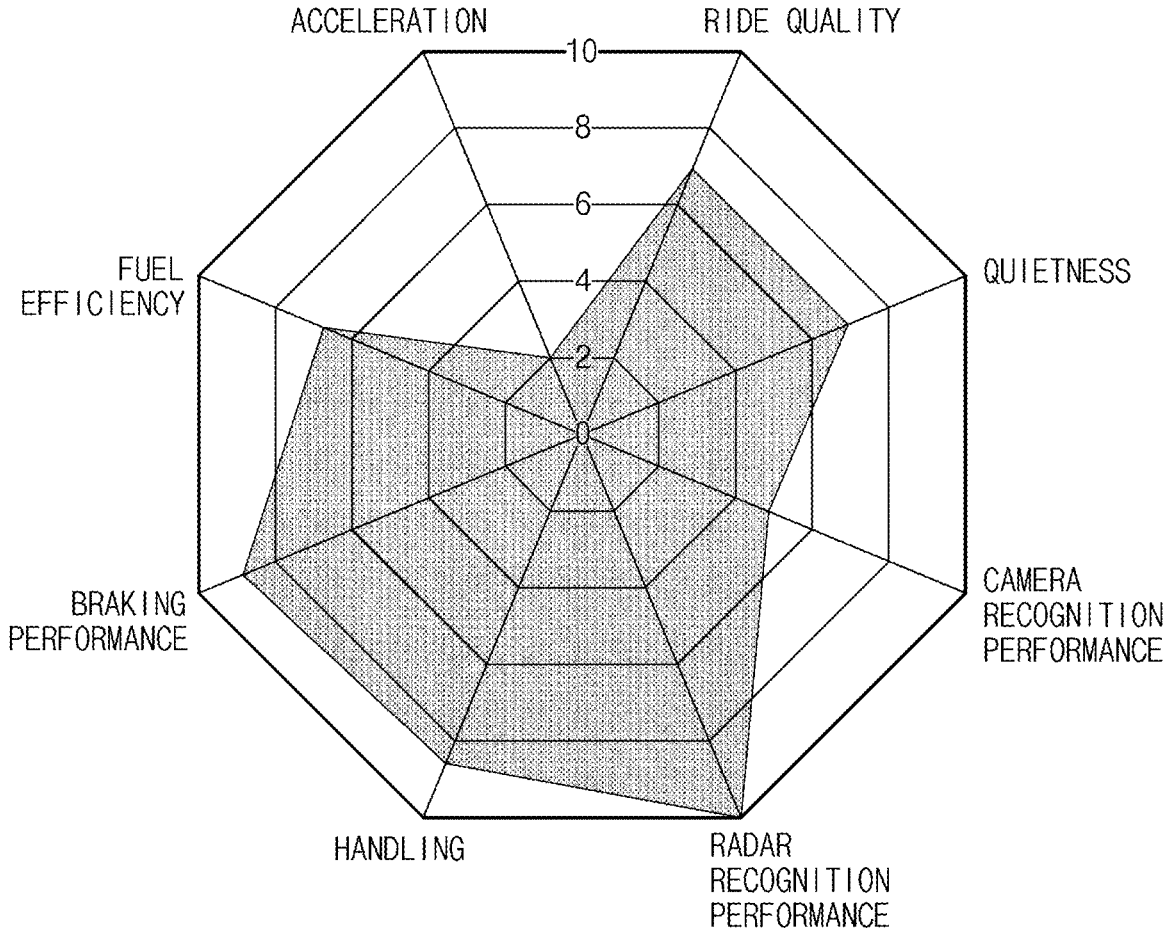
FIG. 6 is a conceptual diagram illustrating information provided by an autonomous driving control apparatus according to an embodiment of the present disclosure.

FIG. 6 is a conceptual diagram illustrating information provided by an autonomous driving control apparatus according to an embodiment of the present disclosure.

According to an embodiment, an autonomous driving control apparatus (e.g., an autonomous driving control apparatus 100 of FIG. 1) may output information about a performance state of a host vehicle to a user.

As an example, the autonomous driving control apparatus may change and output a change about driving performance of the host vehicle, which includes information about performance of an autonomous driving control function (e.g., at least one of acceleration, ride quality, quietness, camera recognition performance, radar recognition performance, handling, braking performance, fuel efficiency, or any combination thereof) to a user based on a specified period, using a notification device (e.g., a notification device 120 of FIG. 1) including a display device.

Figure 7:
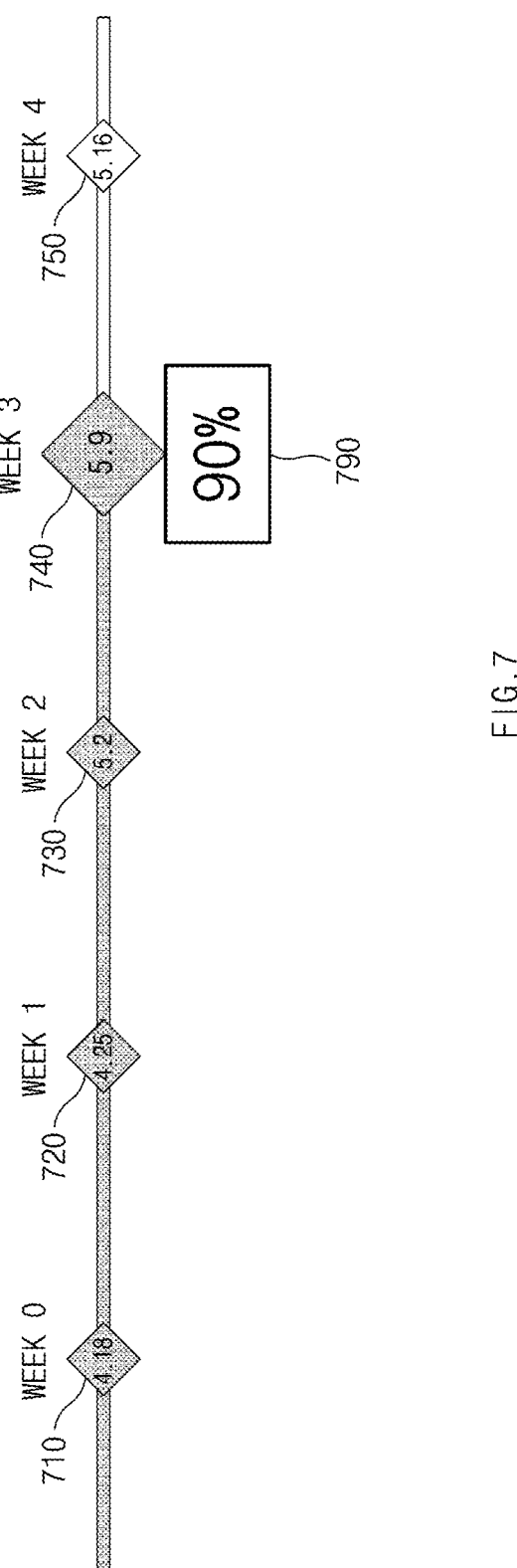
FIG. 7 is a conceptual diagram illustrating information provided by an autonomous driving control apparatus according to an embodiment of the present disclosure.

FIG. 7 is a conceptual diagram illustrating information provided by an autonomous driving control apparatus according to an embodiment of the present disclosure.

According to an embodiment, when receiving an improvement request input about a problem of an autonomous driving control function (e.g., a debug request input about the autonomous driving control function) from a user, an autonomous driving control apparatus (e.g., an autonomous driving control apparatus 100 of FIG. 1) may transmit data logging about driving of a host vehicle before a specified time from a time point when the user input is received to an external device.

For example, the autonomous driving control apparatus may output a user interface about a debug request using a notification device and may receive a user input (e.g., a debug request input) for the user interface. The user interface about the debug request may include a list about a problem, such as an acceleration problem or a braking program, which occurs while the host vehicle is driving. When a user input to an area corresponding to the acceleration problem is received, the autonomous driving control apparatus may identify that a debug request input for the acceleration problem is received from the user.

For example, the autonomous driving control apparatus may receive information about whether an autonomous driving control function deteriorates, which corresponds to data logging, and deterioration improvement information from the external device.

For example, the autonomous driving control apparatus may output the information about whether there is deterioration according to FIG. 7 and the deterioration improvement information to the user.

As an example, the autonomous driving control apparatus may output information including at least one of a deterioration improvement history, whether improvement is possible, a deterioration improvement degree, or whether deterioration improvement is possible, or any combination thereof.

As an example, the autonomous driving control apparatus may output deterioration improvement information including a plurality of icons 710, 720, 730, 740, and 750 corresponding to weeks 0 to 4 from a time point when the debug request input is received. When a user input (e.g., a touch input) to each icon is received, the autonomous driving control apparatus may output deterioration improvement information of a period corresponding to the icon to the user.

As an example, according to the user interface shown in FIG. 7, the autonomous driving control apparatus may output information that deterioration improvement is performed by about 90% in week 3 to the user.

As an example, when the debug request input is received a plurality of times from the user, the autonomous driving control apparatus may output a list including an item corresponding to each input to the user. Furthermore, the autonomous driving control apparatus may output information about an improvement (or update) schedule of each of items scheduled for improvement, which is included in the list, to the user.

Figure 8:
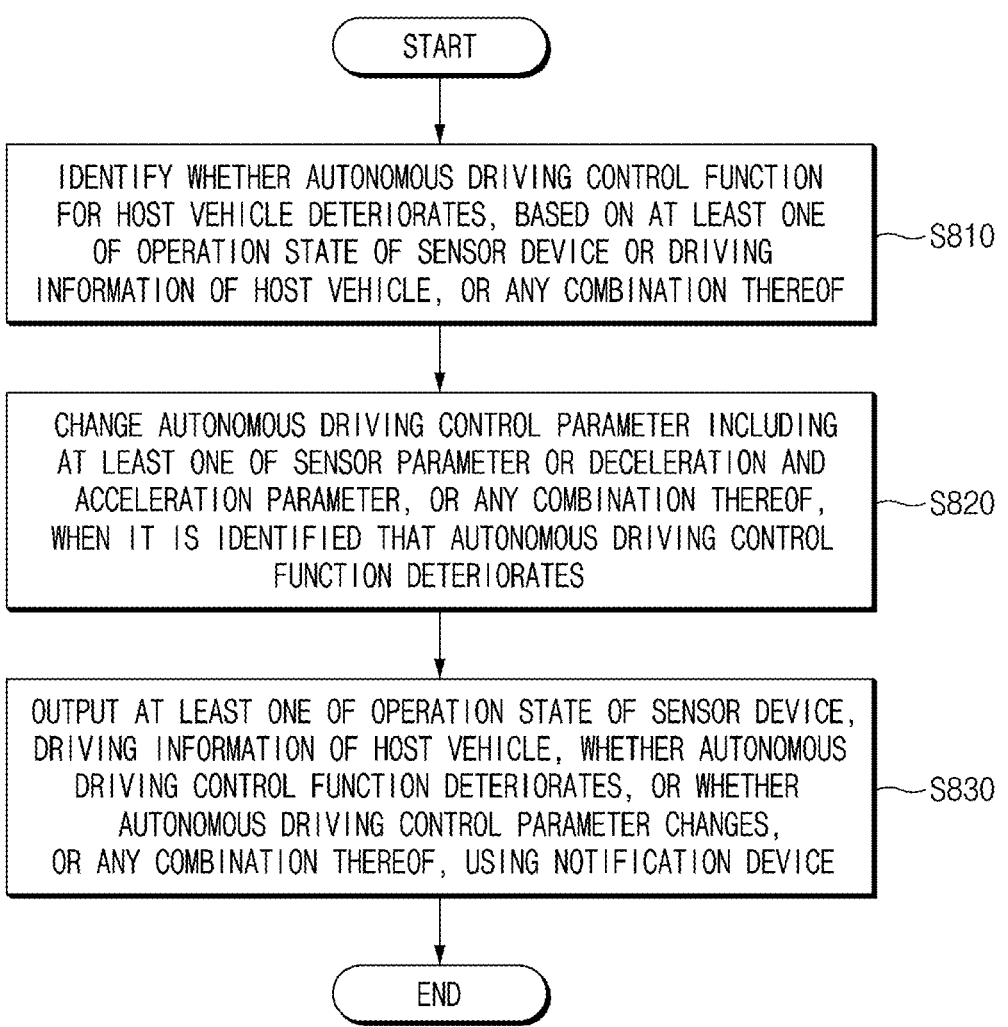
FIG. 8 is a flowchart of an autonomous driving control method according to an embodiment of the present disclosure.

FIG. 8 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 8. For example, at least some of components (e.g., a sensor device 110, a notification device 120, a memory 130, and/or a controller 140 of FIG. 1) included in the autonomous driving control apparatus may be configured to perform the operations of FIG. 8.

Operations in S810 to S830 in an embodiment below may be sequentially performed and are not necessarily sequentially performed. For example, an order of the respective operations may be changed, and at least two operations may be performed in parallel. Furthermore, contents, which correspond to or are duplicated with the contents described above in conjunction with FIG. 8, may be briefly described or omitted.

According to an embodiment, in S810, the autonomous driving control apparatus may identify whether an autonomous driving control function for a host vehicle deteriorates, based on at least one of an operation state of a sensor device, driving information of the host vehicle, or any combination thereof.

According to an embodiment, in S820, the autonomous driving control apparatus may change an autonomous driving control parameter including at least one of a sensor parameter, a deceleration and acceleration parameter, or any combination thereof, when it is identified that the autonomous driving control function deteriorates.

According to an embodiment, in S830, the autonomous driving control apparatus may output at least one of the operation state of the sensor device, the driving information of the host vehicle, whether the autonomous driving control function deteriorates, whether the autonomous driving control parameter changes, or any combination thereof, using a notification device.

Figure 9:
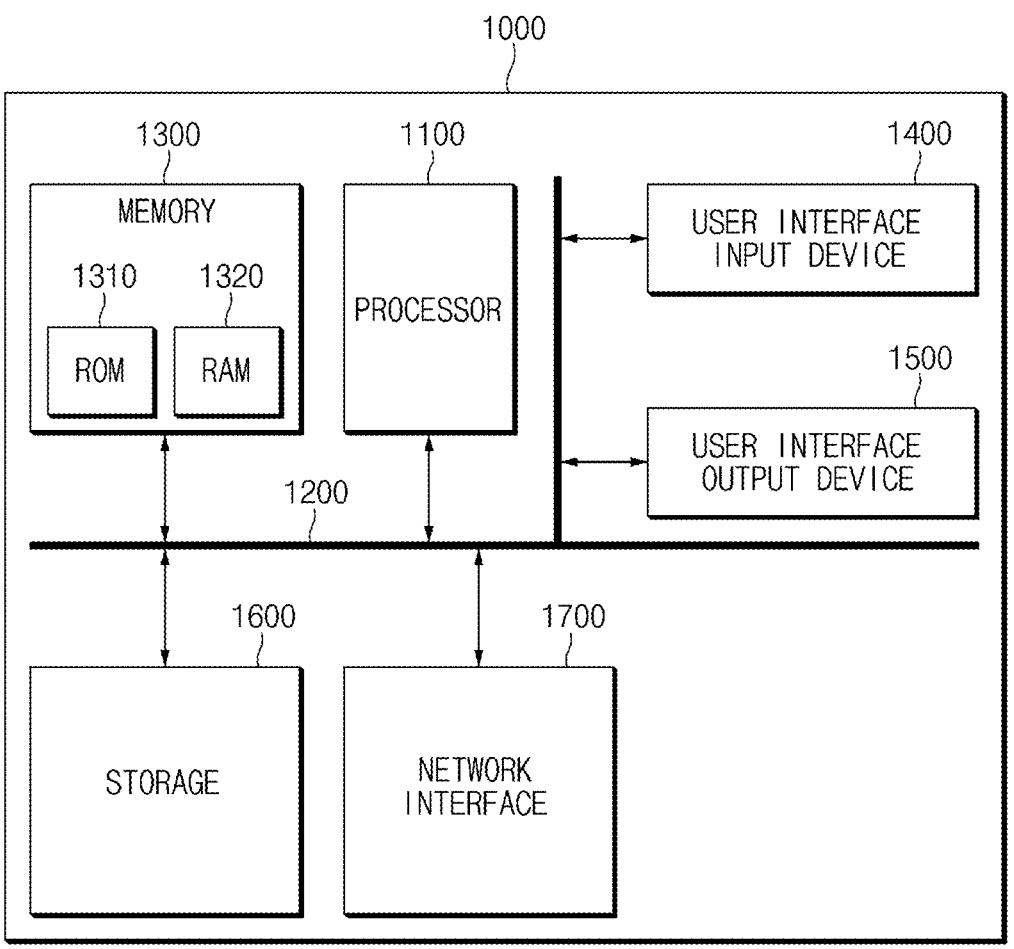
FIG. 9 illustrates a computing system about an autonomous driving control method according to an embodiment of the present disclosure.

FIG. 9 illustrates a computing system about an autonomous driving control method according to an embodiment of the present disclosure.

Referring to FIG. 9, a computing system 1000 about the autonomous driving control method may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600), such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the autonomous driving control apparatus and the method thereof according to an embodiment of the present disclosure.

According to at least one of embodiments of the present disclosure, the autonomous driving control apparatus may provide the user with information about the performance of a performed function and/or the performance of a device (e.g., a sensor), which is operating to perform the function, while performing the function for autonomous driving control based on various schemes (e.g., visual content, audible content, and/or tactile content).

Furthermore, according to at least one of embodiments of the present disclosure, the user may receive information about operation performance of the autonomous driving control apparatus or whether the autonomous driving control apparatus deteriorates in real time. Thus, the reliability of the function may be improved.

Furthermore, according to at least one of embodiments of the present disclosure, the autonomous driving control apparatus may provide the user with information about a scheme for solving a problem, when identifying the problem capable of being directly solved by the user, and thus may guide the user to perform the autonomous driving control function with the improved performance.

Furthermore, according to at least one of embodiments of the present disclosure, the autonomous driving control apparatus may provide information for guiding the user to receive vehicle maintenance, when it is determined that a permanent fault occurs, and thus may prevent a critical situation.

Furthermore, according to at least one of embodiments of the present disclosure, the autonomous driving control apparatus may transmit data logging about driving during a specified time to an external device, when receiving a debug request input from the user, may receive whether there is deterioration corresponding to the transmitted data logging and improvement information for an update and may provide the user with at least some of the pieces of received data.

In addition, various effects ascertained directly or indirectly through the present disclosure may be provided.

Hereinabove, although the present disclosure has been described with reference to embodiments and the accompanying drawings, the present disclosure is not limited thereto but may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but provided only for the illustrative purpose. The scope of the present disclosure should be construed based on the accompanying claims, and all the technical ideas within the scope equivalent to the claims should be included in the scope of the present disclosure.

What is claimed is:

1. An autonomous driving control apparatus, comprising:
a sensor device;
a notification device;
a memory configured to store at least one instruction; and
a controller operatively connected to the sensor device, the notification device, and the memory,
wherein the at least one instruction is configured to, when executed by the controller, cause the autonomous driving control apparatus to:
identify whether an autonomous driving control function for a host vehicle deteriorates, based on at least one of an operation state of the sensor device, driving information of the host vehicle, or any combination thereof;
change an autonomous driving control parameter including at least one of a sensor parameter, a deceleration and acceleration parameter, or any combination thereof, based on identifying that the autonomous driving control function deteriorates;
output deterioration of the autonomous driving control function, using the notification device; and
output at least one of the operation state of the sensor device, the driving information of the host vehicle, whether autonomous driving control parameter changes, or any combination thereof, using the notification device.

2. The autonomous driving control apparatus of claim 1, wherein the at least one instruction is configured to, when executed by the controller, cause the autonomous driving control apparatus to:

output at least one of whether a hardware problem about the sensor device is a temporary problem, whether the hardware problem is recoverable, or any combination thereof using the notification device, based on identifying that the hardware problem occurs, based on a result of comparing sensor data obtained using the sensor device with a reference parameter stored in the memory.

3. The autonomous driving control apparatus of claim 1, wherein the at least one instruction is configured to, when executed by the controller, cause the autonomous driving control apparatus to:

identify software performance of the sensor device, based on a result of comparing sensor data obtained using the sensor device with a reference parameter stored in the memory;

identify the operation state including information that a difference between the identified software performance of the sensor device and predetermined performance is greater than a specified value, based on the identified software performance; and change the sensor parameter based on the operation state identified a specified number of times, when the number of times the operation state is identified is greater than or equal to the specified number of times.

4. The autonomous driving control apparatus of claim 3, wherein the at least one instruction is configured to, when executed by the controller, cause the autonomous driving control apparatus to:

gradually change the changed sensor parameter to an initial parameter as time passes, based on identifying that the difference between the software performance of the sensor device and the predetermined performance is less than or equal to the specified value, after changing the sensor parameter.

5. The autonomous driving control apparatus of claim 1, wherein the at least one instruction is configured to, when executed by the controller, cause the autonomous driving control apparatus to:

identify the driving information including a gradient of a road on which the host vehicle is driving and real-time acceleration of the host vehicle;

identify a difference between the real-time acceleration and required acceleration;

identify at least one deceleration and acceleration parameter for deceleration of the host vehicle based on a magnitude of the difference, based on identifying that the gradient meets a specified condition and that the difference is greater than or equal to a specified value;

perform driving control for the host vehicle based on a minimum value among the at least one deceleration and acceleration parameter; and output information about a change in the deceleration and acceleration parameter and the driving control using the notification device.

6. The autonomous driving control apparatus of claim 1, wherein the at least one instruction is configured to, when executed by the controller, cause the autonomous driving control apparatus to:

identify a driving mode of the host vehicle;

identify required acceleration for each driving speed of the identified driving mode;

accumulate and identify error data including a difference between the required acceleration and real-time acceleration of the host vehicle; and change the deceleration and acceleration parameter based on an average value of the accumulated error data, based on identifying that the error data is accumulated by a specified amount or more.

7. The autonomous driving control apparatus of claim 6, wherein the at least one instruction is configured to, when executed by the controller, cause the autonomous driving control apparatus to:

set and store the changed deceleration and acceleration parameter to a default deceleration and acceleration parameter in the memory; and determine whether the autonomous driving control function deteriorates, based on the default deceleration and acceleration parameter.

8. The autonomous driving control apparatus of claim 1, wherein the at least one instruction is configured to, when executed by the controller, cause the autonomous driving control apparatus to:

compare a reference sensor performance index stored in the memory with the operation state of the sensor device to identify whether the autonomous driving control function deteriorates, and wherein the reference sensor performance index includes at least one parameter less than maximum performance of the sensor device.

9. The autonomous driving control apparatus of claim 1, wherein the at least one instruction is configured to, when executed by the controller, cause the autonomous driving control apparatus to:

transmit data logging about driving of the host vehicle before a specified time from a time point when a debug request input about the autonomous driving control function is received to an external device, based on receiving the debug request input from a user;

receive information about whether the autonomous driving control function deteriorates, the information corresponding to the data logging, and deterioration improvement information from the external device; and output the information about whether the autonomous driving control function deteriorates and the deterioration improvement information, using the notification device.

10. The autonomous driving control apparatus of claim 1, wherein the at least one instruction is configured to, when executed by the controller, cause the autonomous driving control apparatus to:

output a change about driving performance of the host vehicle, the driving performance including at least one of acceleration, ride quality, quietness, camera recognition performance, radar recognition performance, handling, braking performance, fuel efficiency, or any combination thereof, based on a specified period, using the notification device.

11. An autonomous driving control method, comprising:

identifying, by a controller, whether an autonomous driving control function for a host vehicle deteriorates, based on at least one of an operation state of a sensor device, driving information of the host vehicle, or any combination thereof;

changing, by the controller, an autonomous driving control parameter including at least one of a sensor parameter, a deceleration and acceleration parameter, or any combination thereof based on identifying that the autonomous driving control function deteriorates;

outputting deterioration of the autonomous driving control function, using a notification device; and outputting, by the controller, at least one of the operation state of the sensor device, the driving information of the host vehicle, whether the autonomous driving control parameter changes, or any combination thereof, using the notification device.

12. The autonomous driving control method of claim 11, further comprising:

outputting, by the controller, at least one of whether a hardware problem about the sensor device is a temporary problem, whether the hardware problem is recoverable, or any combination thereof using the notification device, based on identifying that the hardware problem occurs, based on a result of comparing sensor data obtained using the sensor device with a reference parameter stored in a memory.

13. The autonomous driving control method of claim 11, further comprising:

identifying, by the controller, software performance of the sensor device, based on a result of comparing sensor data obtained using the sensor device with a reference parameter stored in a memory;

identifying, by the controller, the operation state including information that a difference between the identified software performance of the sensor device and predetermined performance is greater than a specified value, based on the identified software performance; and changing, by the controller, the sensor parameter based on the operation state identified a specified number of times, when the number of times the operation state is identified is greater than or equal to the specified number of times.

14. The autonomous driving control method of claim 13, further comprising:

gradually changing, by the controller, the changed sensor parameter to an initial parameter as time passes, based on identifying that the difference between the software performance of the sensor device and the predetermined performance is less than or equal to the specified value, after changing the sensor parameter.

15. The autonomous driving control method of claim 11, further comprising:

identifying, by the controller, the driving information including a gradient of a road on which the host vehicle is driving and real-time acceleration of the host vehicle;

identifying, by the controller, a difference between the real-time acceleration and required acceleration;

identifying, by the controller, at least one deceleration and acceleration parameter for deceleration of the host vehicle based on a magnitude of the difference, based on identifying that the gradient meets a specified condition and that the difference is greater than or equal to a specified value;

performing, by the controller, driving control for the host vehicle based on a minimum value among the at least one deceleration and acceleration parameter; and outputting, by the controller, information about a change in the deceleration and acceleration parameter and the driving control using the notification device.

16. The autonomous driving control method of claim 11, further comprising:

identifying, by the controller, a driving mode of the host vehicle;

identifying, by the controller, required acceleration for each driving speed of the identified driving mode;

accumulating and identifying, by the controller, error data including a difference between the required acceleration and real-time acceleration of the host vehicle; and changing, by the controller, the deceleration and acceleration parameter based on an average value of the accumulated error data, based on identifying that the error data is accumulated by a specified amount or more.

17. The autonomous driving control method of claim 16, further comprising:

setting and storing, by the controller, the changed deceleration and acceleration parameter to a default deceleration and acceleration parameter in a memory; and determining, by the controller, whether the autonomous driving control function deteriorates, based on the default deceleration and acceleration parameter.

18. The autonomous driving control method of claim 11, further comprising:

comparing, by the controller, a reference sensor performance index stored in a memory with the operation state of the sensor device to identify whether the autonomous driving control function deteriorates, and wherein the reference sensor performance index includes at least one parameter less than maximum performance of the sensor device.

19. The autonomous driving control method of claim 11, further comprising:

transmitting, by the controller, data logging about driving of the host vehicle before a specified time from a time point when a debug request input about the autonomous driving control function is received to an external device, based on receiving the debug request input from a user;

receiving, by the controller, information about whether the autonomous driving control function deteriorates, the information corresponding to the data logging, and deterioration improvement information from the external device; and outputting, by the controller, the information about whether the autonomous driving control function deteriorates and the deterioration improvement information, using the notification device.

20. The autonomous driving control method of claim 11, further comprising:

outputting, by the controller, a change about driving performance of the host vehicle, the driving performance including at least one of acceleration, ride quality, quietness, camera recognition performance, radar recognition performance, handling, braking performance, fuel efficiency, or any combination thereof, based on a specified period, using the notification device.

* * * * *